United States Patent
Cho et al.

(10) Patent No.: US 8,511,201 B2
(45) Date of Patent: Aug. 20, 2013

(54) NOISE REDUCTION APPARATUS FOR SHIFT CABLE

(75) Inventors: Yangrae Cho, Hwaseong-si (KR); Jeehyuck Choi, Hwaseong-si (KR); Hochul Lee, Incheon (KR); Wonmin Lee, Incheon (KR)

(73) Assignees: Hyundai Motor Company, Seoul (KR); Kia Motors Corporation, Seoul (KR); Daedong System Co., Ltd., Incheon (KR)

( * ) Notice: Subject to any disclaimer, the term of this patent is extended or adjusted under 35 U.S.C. 154(b) by 527 days.

(21) Appl. No.: 12/836,157

(22) Filed: Jul. 14, 2010

(65) Prior Publication Data

US 2011/0056325 A1    Mar. 10, 2011

(30) Foreign Application Priority Data

Sep. 7, 2009 (KR) .................. 10-2009-0083934

(51) Int. Cl.
*F16C 1/26* (2006.01)
(52) U.S. Cl.
USPC .................... 74/502.4; 74/502.6
(58) Field of Classification Search
USPC ............ 74/500.5, 501.5 R, 502.4, 502.6
IPC .......................................... F16C 1/26
See application file for complete search history.

(56) References Cited

U.S. PATENT DOCUMENTS

| 4,348,348 | A  | * | 9/1982  | Bennett et al. ................ 264/255 |
| 5,884,531 | A  |   | 3/1999  | Koenig |
| 6,105,458 | A  | * | 8/2000  | Casas Gomila et al. ..... 74/502.4 |
| 6,499,909 | B1 | * | 12/2002 | Scheidling et al. .......... 403/351 |
| 6,540,427 | B2 | * | 4/2003  | Scheidling et al. .......... 403/269 |
| 2003/0089189 | A1 | * | 5/2003 | Tchoi ........................ 74/502.4 |
| 2006/0053943 | A1 | * | 3/2006 | Motonaga et al. ......... 74/502.4 |

FOREIGN PATENT DOCUMENTS

| EP | 987453 A1 | * | 3/2000 |
| JP | 7091429 (A) |   | 4/1995 |
| JP | 2001-254824 A |   | 9/2001 |
| WO | WO 98/23874 (A1) |   | 6/1998 |

* cited by examiner

*Primary Examiner* — Thomas Diaz
(74) *Attorney, Agent, or Firm* — Morgan, Lewis & Bockius LLP

(57) ABSTRACT

A noise reduction apparatus for a shift cable, may include a mounting socket that is fixed to a shift lever mounting bracket, with an inner cable of the shift cable therethrough, a cable connection pipe that has one side connected to a shift lever-sided end of an outer cable of the shift cable, and a housing connection pipe that has one end elastically-coupled to a shift lever-sided end of the cable connection pipe with a predetermined distance therebetween by a first antivibration member in a damper housing and the other end thereof elastically-connected to the shift lever mounting bracket by a second antivibration member in the mounting socket.

7 Claims, 4 Drawing Sheets

NOISE REDUCTION APPARATUS FOR SHIFT CABLE

CROSS-REFERENCE TO RELATED APPLICATIONS

The present application claims priority to Korean Patent Application Number 10-2009-0083934 filed Sep. 7, 2009, the entire contents of which application is incorporated herein for all purposes by this reference.

BACKGROUND OF THE INVENTION

1. Field of the Invention

The present invention relates to a noise reduction apparatus for a shift cable, in more detail, a technology that can be used to prevent gear whine noise of an automatic transmission vehicle from traveling into the passenger compartment through a shift cable.

2. Description of Related Art

A transmission equipped in vehicles has a basic structure that has a shift lever, which is an internal operator, regardless of whether it is a manual transmission or an automatic transmission, and transmits the operational force of the shift lever to the transmission through a shift cable.

Therefore, gear whine noise generated from the transmission having the structure can travel into the passenger compartment through the shift cable, and accordingly, a method of attaching a mass damper to the shift cable is commonly used in the related art to exclude the noise.

The method of attaching a mass damper to the shift cable described above, however, has a problem that the weight is necessarily increased by the mass damper and the cost is considerable.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a noise reduction apparatus for a shift cable which can improve silence and ride comfort of the vehicle by effectively absorbing and preventing noise from traveling into the passenger compartment from the transmission through the shift cable, without using an excessive weight, such as a mass damper.

In an aspect, the present invention may provide a noise reduction apparatus for a shift cable having a mounting socket that is fixed to a shift lever mounting bracket, with an inner cable of the shift cable therethrough, a cable connection pipe that has one side connected to a shift lever-sided end of an outer cable of the shift cable, and a housing connection pipe that has one end elastically-coupled to a shift lever-sided end of the cable connection pipe with a predetermined distance therebetween by a first antivibration member in a damper housing and the other end thereof elastically-connected to the shift lever mounting bracket by a second antivibration member in the mounting socket.

The shift lever-sided end of the cable connection pipe may have a flange having an increased diameter, the housing connection pipe has first and second flanges having an increased diameter at both the end one and the other end thereof respectively, the damper housing is formed to cover the flange of the cable connection pipe and the first flange of the housing connection pipe to prevent the flange of the cable connection pipe and the first flange of the housing connection pipe from opening, and the first antivibration member prevents direct contact among the damper housing, the flange of the cable connection pipe and the first flange of the housing connection pipe, and the second antivibration member prevents direct contact between the mounting bracket and the second flange of the housing connection pipe.

The mounting socket may be formed to cover the second flange of the housing connection pipe to restrict relative motion of the second flange in a longitudinal direction of the shift cable with respect to the mounting socket.

The flange of the cable connection pipe and the first flange of the housing connection pipe in the damper housing may be positioned to correspond to each other in the same shape, and the one end and the other end of the housing connection pipe are formed in the same shape in symmetry.

The cable connection pipe may further include a spacer formed along an inner circumference thereof to receive the inner cable therein.

The housing connection pipe may further include a spacer formed along an inner circumference thereof to receive the inner cable therein.

In another aspect of the present invention, the noise reduction apparatus for a shift cable, may include a mounting socket that is fixed to a shift lever mounting bracket, with an inner cable of the shift cable therethrough, a cable connection pipe that has one side connected to a shift lever-sided end of an outer cable of the shift cable, and a damper housing that has one side elastically coupled to a shift lever-sided end of the cable connection pipe by a first antivibration member therein and the other side thereof elastically coupled to the shift lever mounting bracket in the mounting socket by a second antivibration member.

The damper housing may have an integral flange having an increased diameter at the other end thereof which is disposed in the mounting socket while the one side thereof covers a flange formed in the shift lever-sided end of the cable connection pipe and elastically coupled thereto by the first antivibration in the damper housing, wherein the first antivibration member prevents direct contact between the flange of the cable connecting pipe and the damper housing, and the mounting socket is formed to cover the integral flange of the damper housing and elastically coupled thereto by the second antivibration to restrict relative motion of the integral flange in a longitudinal direction of the shift cable with respect to the mounting socket, wherein the second antivibration member prevents direct contact between the integral flange of the damper housing and the mounting socket.

The cable connection pipe may further include a spacer formed along an inner circumference thereof to receive the inner cable therein.

In further another aspect of the present invention, the noise reduction apparatus for a shift cable, may include at least two cable connection pipes that have one side connected to an end of an outer cable of the shift cable and the other side thereof having a flange having an increased diameter respectively, a damper housing that is formed to cover the flanges formed in the other side of the respective cable connection pipe to prevent the flanges from opening, wherein the flanges are spaced with a predetermined distance therebetween in the damper housing, and an antivibration member elastically coupling the flanges in the damper housing to prevent direct contact between the flanges of the respective cable connection pipe and between the flanges and the damper housing.

An inner diameter of the cable connection pipe may be set such that an inner cable of the shift cable passes the cable connection pipe without contacting, wherein the cable connection pipe and the outer cable are connected by swaging.

The respective cable connection pipe may further include a spacer formed along an inner circumference thereof to receive the inner cable therein.

The respective cable connection pipe may have a T-formed cross section with the flange, and the damper housing may have a U-formed cross section that covers the flanges having a T-formed cross section while rotating about the respective cable connection pipe.

The present invention makes it possible to improve silence and ride comfort of a vehicle by effectively absorbing and intercepting noise traveling into the vehicle from the transmission through a shift cable, without using an excessive weight, such as a mass damper.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

Figure 1:
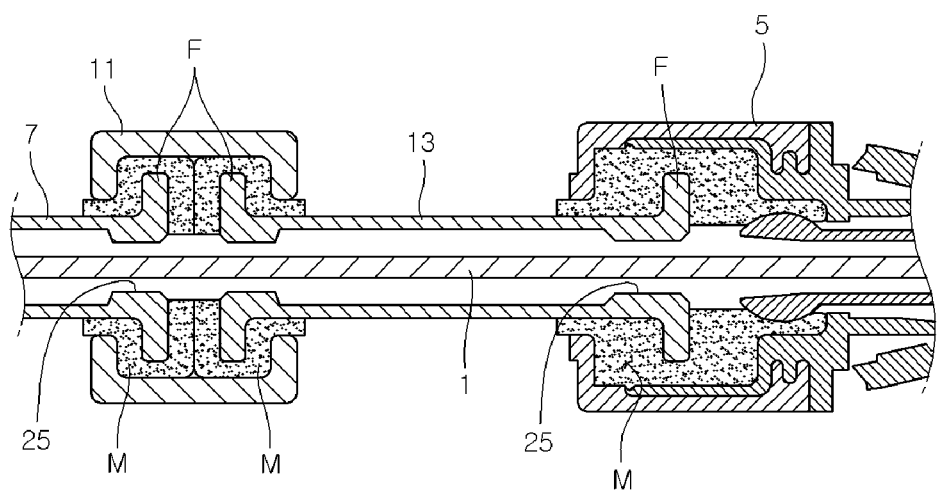
FIG. 1 is a view showing an exemplary noise reduction apparatus for a shift cable according to the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 4:
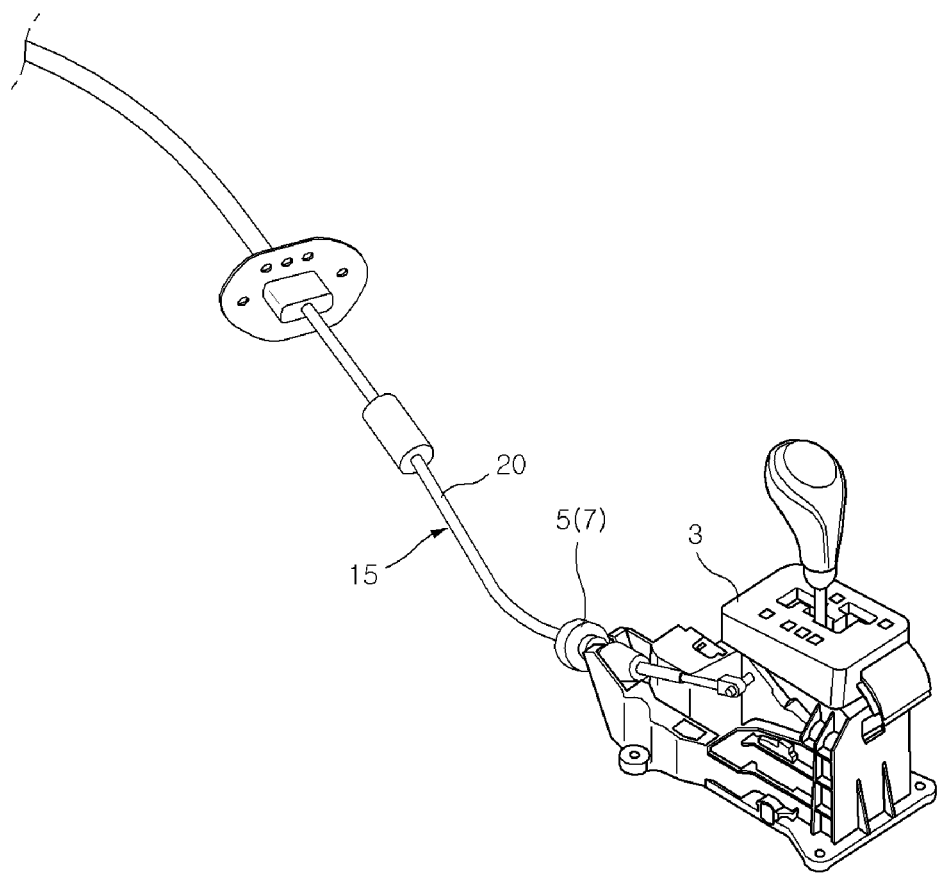
FIG. 4 is a view illustrating when an exemplary mounting socket according to the present invention is mounted.

Referring to FIGS. 1 and 4, an exemplary embodiment of the present invention includes, a mounting socket 5 that is fixed to a shift lever mounting bracket 3, with an inner cable 1 of a shift cable 15 therethrough, a cable connection pipe 7 that has one side connected to the shift lever-sided end of an outer cable 20 of shift cable 15, a damper housing 11 that is connected to the shift lever-sided end of cable connection pipe 7 by an antivibration member M, and a housing connection pipe 13 that has one end connected to damper housing 11 by an antivibration member M and the other end connected to mounting socket 5 by an antivibration member M.

That is, vibration transmitted through the outer cable 20 of shift cable 15 is intercepted by a double antivibration structure that intercepts the vibration primarily at damper housing 11 and secondarily at mounting socket 5.

The shift lever-sided end of cable connection pipe 7 has a flange F having an increased diameter, housing connection pipe 13 also has a flange F having an increased diameter at both ends, damper housing 11 is shaped to cover flange F of cable connection pipe 7 and flange F of housing connection pipe 13 and prevents the flanges from opening, and antivibration member M prevents direct contact between damper housing 11, flange F of cable connection pipe 7, and flange F of housing connection pipe 13.

That is, cable connection pipe 7 has a T-shaped cross section with flange F, housing connection pipe 13 also has a T-shaped cross section at one side, similar to flange F of cable connection pipe 7, while facing flange F of cable connection pipe 7, and damper housing 11 has a U-shaped cross section that covers two flanges F having a T-shaped cross section while rotating about cable connection pipe 7.

Mounting socket 5 is shaped to cover flange F of housing connection pipe 13 to restrict relative motion of flange F in the longitudinal direction of shift cable 15 with respect to mounting socket 5, and antivibration member M prevents direct contact between flange F of housing connection pipe 13 and mounting socket 5.

Flange F of cable connection pipe 7 and flange F of housing connection pipe 13 in damper housing 11 are positioned to correspond to each other in the same shape, and both ends of housing connection pipe 13 are formed in the same shape in symmetry.

That is, housing connection pipe 13 and cable connection pipe 7 basically have the same shape, but cable connection pipe 7 has only at one side the same shape as housing connection pipe 13.

Cable connection pipe 7 and the outer cable 20 are connected by swaging and the inner diameter of cable connection pipe 7 is set such that inner cable 1 of shift cable 15 pass the cable connection pipe without contacting.

In an exemplary embodiment of the present invention, the cable connection pipe 7 and the housing connection pipe 13 may include a spacer 25 along inner circumference thereof such that the contact between the inner cable 1 and the cable and housing connection pipes 7 and 13 may be minimized.

Therefore, noise traveling from the transmission to the shift lever through the outer cable 20 of shift cable 15 is primarily absorbed and intercepted by the antivibration member M in damper housing 11 and the secondarily absorbed and intercepted by antivibration member M in mounting socket 5, such that the noise does not substantially travels into the interior. Accordingly, it is possible to improve silence and ride comfort of the vehicle.

For reference, mounting socket 5 is fixed to shift lever mounting bracket 3 equipped with the rotatable shift lever, as shown in FIG. 4, such that shift cable 15 is fixed to shift lever mounting bracket 3.

Figure 2:
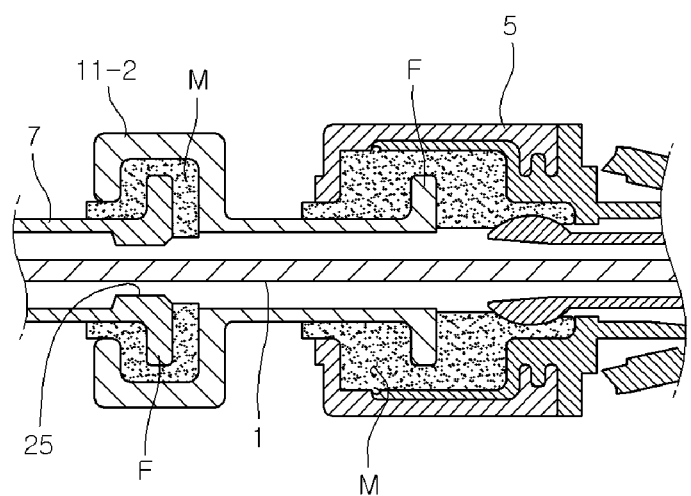
FIG. 2 is a view showing another exemplary noise reduction apparatus for a shift cable according to the present invention.

FIG. 2 shows another exemplary embodiment of the present invention, which includes a mounting socket 5 that is fixed to a shift lever mounting bracket 3, with an inner cable 1 of a shift cable 15 therethrough, a cable connection pipe 7 that has one side connected to the shift lever-sided end of an outer cable 20 of shift cable 15.

The present exemplary embodiment may further includes a damper housing 11-2 which is formed by integrally fixing the housing connection pipe 13 to the damper housing 11 such that the damper housing 11-2 has one side connected to the shift lever-sided end of cable connection pipe 7 by an antivibration member M and the other side connected to mounting socket 5 by an antivibration member M.

The shift lever-sided end of cable connection pipe 7 has a flange F having an increased diameter, damper housing 11-2 has an integral flange F having an increased diameter at the end in mounting socket 5 while covering flange F of cable connection pipe 7, mounting socket 5 is shaped to cover flange F of damper housing 11-2 to restrict relative motion of flange F in the longitudinal direction of shift cable 15 with respect to mounting socket 5, antivibration member M prevents direct contact between flange F of damper housing 11-2 and mounting socket 5, and antivibration member M prevents direct contact between damper housing 11 and flanges F of cable connection pipe 7.

In an exemplary embodiment of the present invention, the cable connection pipe 7 may include a spacer 25 along inner circumference thereof such that the contact between the inner cable 1 and the cable connection pipe 7 may be minimized.

That is, as compared with the exemplary embodiment of FIG. 1, the present exemplary embodiment reduces the number of parts, the weight, and the assembly process, by removing housing connection pipe 13 and making damper housing 11-2 itself function as housing connection pipe 13.

Figure 3:
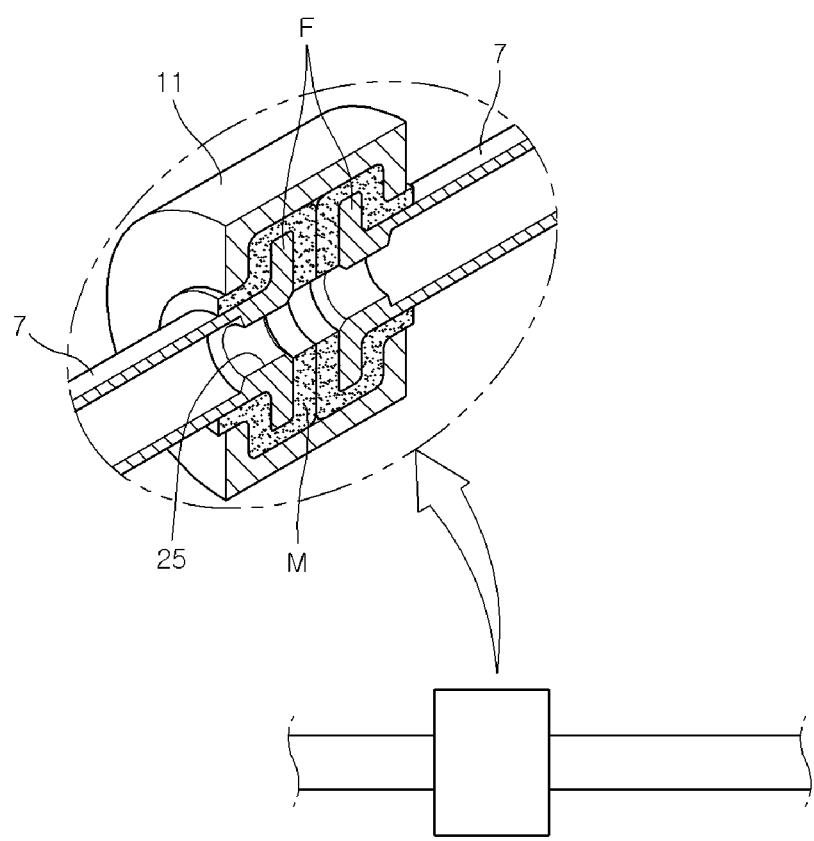
FIG. 3 is a view showing another exemplary noise reduction apparatus for a shift cable according to the present invention.

FIG. 3 shows another exemplary embodiment of the present invention, which includes a cable connection pipe 7 that has one side connected to the end of an outer cable 20 of a shift cable 15 and the other side with a flange F having an increased diameter, a damper housing 11 that is shaped to cover two opposite flanges F of cable connection pipe 7 to prevent the flanges from opening, and an antivibration member M that prevents direct contact between two flanges F of cable connection pipe 7 and between two flanges F and damper housing 11.

In the present exemplary embodiment, two cable connection pipe 7 and damper housing 11 are disposed at the middle portion of shift cable 15, such that this configuration makes it possible to freely select an optimum mounting position because the entire noise-traveling characteristics of shift cable 15 change in accordance with the position of damper housing 11, and can be used to replace when it is hard to install shift lever mounting bracket 3, and mounting socket 5 and damper housing 11 around the shift lever mounting bracket.

Cable connection pipe 7 and the outer cable 20 are connected by swaging and the inner diameter of cable connection pipe 7 is set such that inner cable 1 of shift cable 15 pass the cable connection pipe without contacting.

In an exemplary embodiment of the present invention, the cable connection pipe 7 may include a spacer 25 along inner circumference thereof such that the contact between the inner cable 1 and the cable connection pipe 7 may be minimized.

Cable connection pipe 7 has a T-shape cross section with flange F and damper housing 11 has a U-shaped cross section that covers two T-shaped flanges F while rotating about cable connection pipe 7.

Antivibration members M may be made of rubber in the exemplary embodiments, and any other materials may be used as long as they can effectively absorb and intercept vibration and maintain mechanical stable positional relationships among damper housing 11, cable connection pipe 7, and housing connection pipe 13.

For convenience in explanation and accurate definition in the appended claims, the terms "inner" or "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A noise reduction apparatus for a shift cable, comprising:
   a mounting socket that is fixed to a shift lever mounting bracket, with an inner cable of the shift cable therethrough;
   a cable connection pipe that has one side connected to a shift lever-sided end of an outer cable of the shift cable; and
   a housing connection pipe that has one end elastically-coupled to a shift lever-sided end of the cable connection pipe with a predetermined distance therebetween by a first antivibration member in a damper housing and the other end thereof elastically-connected to the shift lever mounting bracket by a second antivibration member in the mounting socket;
   wherein the shift lever-sided end of the cable connection pipe has a flange having an increased diameter;
   wherein the housing connection pipe has first and second flanges having an increased diameter at both the one end and the other end thereof respectively;
   wherein the damper housing is formed to cover the flange of the cable connection pipe and the first flange of the housing connection pipe to prevent the flange of the cable connection pipe and the first flange of the housing connection pipe from opening; and
   wherein the first antivibration member prevents direct contact among the damper housing, the flange of the cable connection pipe and the first flange of the housing connection pipe, and the second antivibration member prevents direct contact between the mounting bracket and the second flange of the housing connection pipe.

2. The noise reduction apparatus for the shift cable as defined in claim 1, wherein the mounting socket is formed to cover the second flange of the housing connection pipe to restrict relative motion of the second flange in a longitudinal direction of the shift cable with respect to the mounting socket.

3. The noise reduction apparatus for the shift cable as defined in claim 2, wherein the flange of the cable connection pipe and the first flange of the housing connection pipe in the damper housing have the same shape and are positioned to face one another; and
   wherein the one end and the other end of the housing connection pipe are formed in the same shape in symmetry.

4. The noise reduction apparatus for the shift cable as defined in claim 1, wherein the cable connection pipe further includes a spacer formed along an inner circumference thereof to receive the inner cable therein.

5. The noise reduction apparatus for the shift cable as defined in claim 1, wherein the housing connection pipe further includes a spacer formed along an inner circumference thereof to receive the inner cable therein.

6. A noise reduction apparatus for a shift cable, comprising:
- a mounting socket that is fixed to a shift lever mounting bracket, with an inner cable of the shift cable therethrough;
- a cable connection pipe that has one side connected to a shift lever-sided end of an outer cable of the shift cable; and
- a damper housing that has one side elastically coupled to a shift lever-sided end of the cable connection pipe by a first antivibration member therein and the other side thereof elastically coupled to the shift lever mounting bracket in the mounting socket by a second antivibration member,
- wherein the damper housing has an integral flange having an increased diameter at the other end thereof which is disposed in the mounting socket while the one side thereof covers a flange formed in the shift lever-sided end of the cable connection pipe and elastically coupled thereto by the first antivibration in the damper housing, wherein the first antivibration member prevents direct contact between the flange of the cable connecting pipe and the damper housing; and
- wherein the mounting socket is formed to cover the integral flange of the damper housing and elastically coupled thereto by the second antivibration to restrict relative motion of the integral flange in a longitudinal direction of the shift cable with respect to the mounting socket, wherein the second antivibration member prevents direct contact between the integral flange of the damper housing and the mounting socket.

7. The noise reduction apparatus for the shift cable as defined in claim 6, wherein the cable connection pipe further includes a spacer formed along an inner circumference thereof to receive the inner cable therein.

* * * * *